(12) United States Patent  (10) Patent No.: US 7,216,165 B2
Dalal et al.  (45) Date of Patent: May 8, 2007

(54) STEAMING MEDIA QUALITY ASSESSMENT SYSTEM

(75) Inventors: Amy Dalal, Sunnyvale, CA (US); Edward H. Perry, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 873 days.

(21) Appl. No.: 10/358,878

(22) Filed: Feb. 4, 2003

(65) Prior Publication Data

US 2004/0153561 A1  Aug. 5, 2004

(51) Int. Cl.
*G06F 15/173* (2006.01)
*G06F 15/16* (2006.01)

(52) U.S. Cl. ............ 709/224; 709/224; 709/231; 709/203

(58) Field of Classification Search ........ 709/224–226, 709/231–232, 203
See application file for complete search history.

(56) References Cited

U.S. PATENT DOCUMENTS

| | | | |
|---|---|---|---|
| 6,791,579 B2 * | 9/2004 | Markel | 715/719 |
| 6,820,055 B2 * | 11/2004 | Saindon et al. | 704/235 |
| 2001/0042249 A1 * | 11/2001 | Knepper et al. | 725/42 |
| 2002/0059144 A1 * | 5/2002 | Meffert et al. | 705/51 |
| 2002/0089530 A1 * | 7/2002 | Markel | 345/719 |
| 2002/0112247 A1 * | 8/2002 | Horner et al. | 725/112 |
| 2003/0037261 A1 * | 2/2003 | Meffert et al. | 713/201 |
| 2004/0051812 A1 * | 3/2004 | Hayward | 348/460 |
| 2004/0148386 A1 * | 7/2004 | Bushmitch et al. | 709/224 |

* cited by examiner

*Primary Examiner*—David Wiley
*Assistant Examiner*—David England
(74) *Attorney, Agent, or Firm*—Richard P. Lange

(57) ABSTRACT

A streaming media assessment system comprises assessment servers, media clients, data collection points, helper agents, and report servers. An assessment tool is downloaded or otherwise installed on an end-user client machine and associated with its media player. An assessment server is in communication with the assessment tool over the network and can send control messages to conduct tests and gather information from the assessment tool. The client machine media player is controlled to stop and start by the assessment tool and it will provide measurements that can be forwarded to the assessment servers. Analyses are then produced by the assessment servers of the actual media streams that were received by many such client machine media players. The report servers issue various formatted reports for the system's sponsors and subscribers.

15 Claims, 2 Drawing Sheets

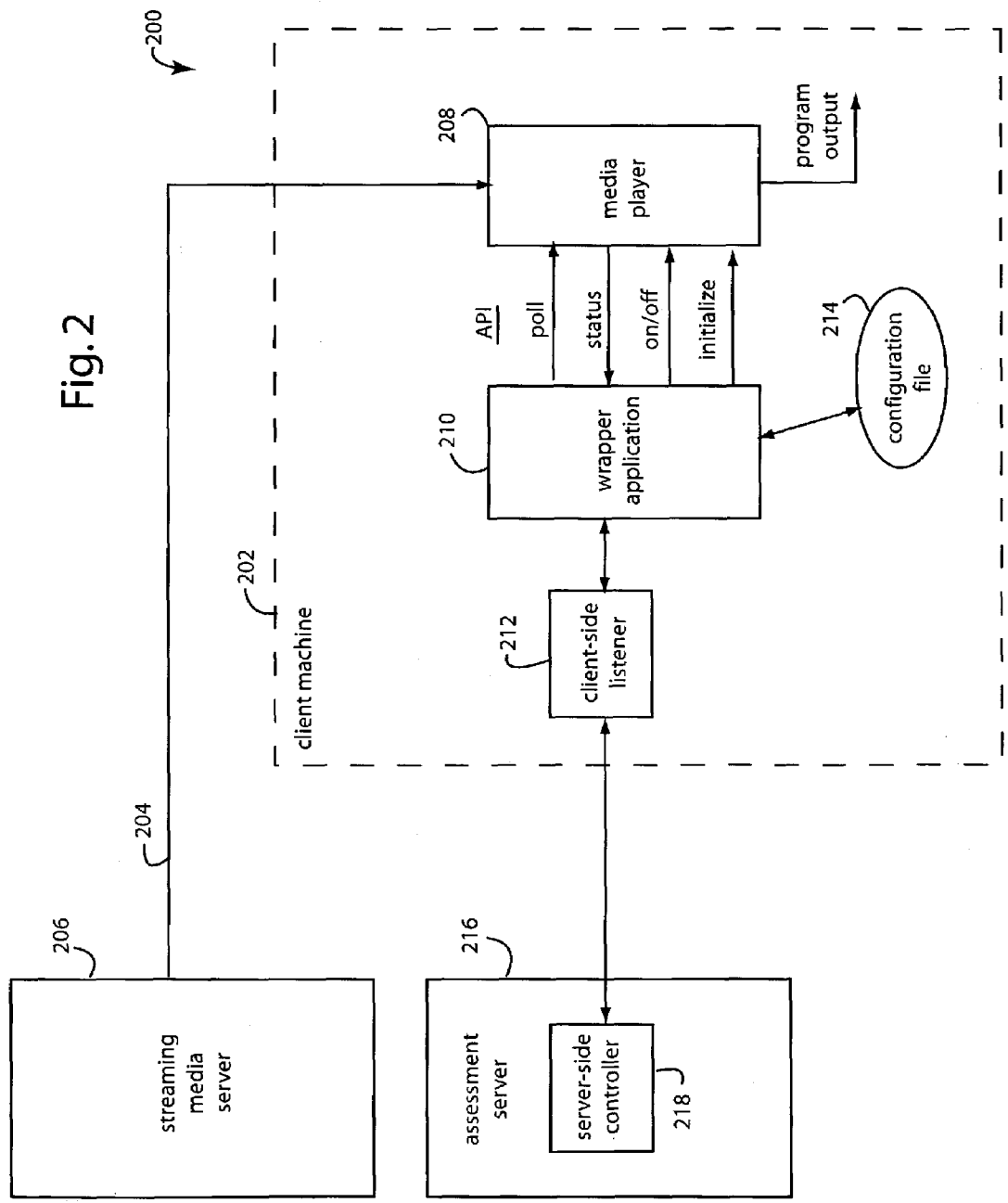

STEAMING MEDIA QUALITY ASSESSMENT SYSTEM

FIELD OF THE INVENTION

The present invention relates to media quality assessment systems, and more specifically to accurate streaming media quality assessments that do not require any assistance from the client-machine users.

BACKGROUND OF THE INVENTION

The Internet is now being use to "broadcast" or carry continuous video and audio program streams. But the nature of the Internet is that packets of data are individually launched toward the recipient, without any guarantee of delivery time or delivery at all. So long data streams can experience problems at the receiving end because they must be broken up into packets. Such packets can be corrupted, late in arriving, or missing altogether.

The type of streaming media involved will determine how sensitive the content is to these transmission defects. Some error detection and recovery schemes can be used to detect and fill in some of the holes in the received data streams. The Internet itself between a particular point-A and point-B can introduce communication problems on the data streams too.

Various Internet users need to know how well the Internet is performing and how well the content is surviving the transmission. Sometimes this information is needed before actually sending a program or requesting it, and sometimes the need-to-know is post-transmission. For example, broadcasters and Internet Service Providers (ISP's) need to assess actual delivery quality of the program to the consumer.

Absent requiring manual feedback from the user, the prior art does not do a good job of assessing streaming media quality from the end-user's perspective. In conventional systems, the data collection, test setup, and data analysis tasks are not fully automated. An automated tool is needed that is compatible with commercial client-side media player applications and that evaluates the actual media streams in use.

Conventional software measures and assesses streaming media quality from the transmission source, or some midpoint along the way to the consumer. The prior art does not generally provide open interfaces or linkage to other management and assessment systems. For example, NetIQ Corporation's CHARIOT product uses specialized endpoints that send and receive synthetic traffic to emulate real media servers and receivers, in packet size and rate. See, www.netiq.com. But such tool cannot assess stream start-up delay, player stall, or other characteristics relevant to actual media clients. It is not scalable, and it cannot interpret or adequately aggregate data for high-level representations of stream quality.

BroadStream (Woodland Hills, Calif.) markets audience metrics, performance assurance, diversified delivery networks, media services, and professional services. See, www-.broadstream.com. A software application of theirs monitors the quality of streaming media and can adjust it on-the-fly if the software detects a problem. If one delivery network fails, the stream can be re-routed without significantly affecting the end user. The software generates a report regarding the end-user's experience and behavior during the Webcast. The BroadStream software reports on how well a Webcast transmission is being received, who's watching it, and for how long.

The audience metrics service assesses the content quality at its destination and how many people received it. The BroadStream.com service downloads a JAVA applet to the client that looks at actual end-user activity and data quality, and reports a quality assessment back to the content producers. But such requires end-user involvement. It does not do independent testing or fault isolation, and it requires clients to communicate to a single central service location on the Internet. No authentication mechanism or control by the end user is provided to disable the assessment and the associated information collection.

Streamcheck (Toronto, Ontario, Canada) provides services that operate similar to those of Broadstream. See, www.streamcheck.com. A subjective measurement is generated from measurements of the initial connection and total stream buffering time, as compared to total playback time. Streamcheck does only scheduled tests on pre-submitted media streams and uses synthetic test clients.

Keynote Systems, Inc., (San Mateo, Calif.) provides products that measure the streaming media quality at locations along the Internet backbone using actual client applications. STREAMING PERSPECTIVE is a performance measurement service for measuring the quality of streaming audio and video on the Internet. The service is a completely outsourced way to measure, assure, compare, diagnose and improve the performance of streaming content. See, www.keynote.com. However, such is limited to test-mode functionality only. They do not measure desktop performance as seen by the actual end-users.

Lariat Software (Sunnyvale, Calif.) markets their MEDIA REPORTS product that includes network and server reports focused on packet delivery statistics, delivery efficiency, server errors and files causing server errors, server capacity statistics. Such information is used to understand how servers are delivering content, and to spot delivery problems and file errors. These reports provide server usage patterns for maintenance scheduling and analyzing needs for infrastructure server and licenses investment. See, www.lariat.com/mediarep/index.htm. MEDIA REPORTS gets information from the log files of media servers to provide an assessment of stream quality. Such techniques are proprietary, and are not open to general integration into a complete assessment service. They do not provide for testing and fault isolation independent of end-user cooperation, and cannot accurately assess quality as seen at the client.

Real-time transport protocol (RTP) for media streaming is related to real-time control protocol (RTCP) that reports on the quality of received streams from the client. See, H. Schulzrinne, S. Casner, R. Frederick, and V. Jacobson, "RTP: A Transport Protocol for Real-Time Applications," IETF RFC 1889, January 1996. The RTCP protocol is not very scalable, and is generally disabled in real production deployments of the media servers and players that include standard RTP. The commercially popular servers and players do not fully support standard RTP.

RealNetworks' REALPLAYER (www.real.com), Microsoft's WINDOWS MEDIA PLAYER, and other proprietary media players, support quality feedback agents that attempt to adjust stream server characteristics. Generally, such agents work with the server to enable lower bit-rate media streams, and are not provided for general fault diagnosis.

Recent prior art has focused on instrumenting client-side media players in order to assess the quality of received video streams. For example, Y. Wang, M. Claypool, and Z. Zuo, published "An Empirical Study of RealVideo Performance Across the Internet," Proceedings of the ACM SIGCOMM Internet Measurement Workshop 2001, San Francisco, Calif., November 2001, that studies user-perceived video quality using an instrumented version of RealPlayer. The application is fully user-controlled, but it requires the user to manually rate their perception of the video quality once a clip has played.

D. Loguinov and H. Radha, describe in "Measurement Study of Low-Bitrate Internet Video Streaming," Proceedings of the ACM SIGCOMM Internet Measurement Workshop 2001, San Francisco, Calif., November 2001, a measurement study of streaming video to dial-up modem clients that uses instrumented MPEG-4 receivers. The video client used measured network/path and packet statistics without mapping such metrics to the received video quality as perceived by the user.

The mapping between objective measurements and subjective video quality for MPEG-1 and Windows Media clips over a DiffServ network is described by W. Ashmawi, R. Guerin, S. Wolf, and M. H. Pinson, in "On the Impact of Policing and Rate Guarantees in Diff-Serv Networks: A Video Streaming Application Perspective," *Proceedings of the ACM SIGCOMM'01*, San Diego, Calif., August 2001, pp. 83–95. The mapping measures both the sent and received video streams to extract key parameters that are then compared in building a subjective quality score. The software depends on knowing about both the sent and received video streams. The quality score calculation is done off-line, and not in real-time as the stream is playing.

SUMMARY OF THE INVENTION

An object of the present invention is to provide a tool that can automatically provide an end-user view of a streaming media session.

Another object of the present invention is to provide a mechanism for determining the subjective quality of a received streamed media file without requiring manual user feedback.

A further object of the present invention is to provide a mechanism for determining the subjective quality of a received streamed media file that uses the number of lost packets, knowledge of buffering events and other readily-obtainable stream metrics.

Another object of the present invention is to provide an assessment tool for existing client media player software that measures data from actual media streams.

A still further object of the present invention is to provide an assessment tool for existing client media player software that does not depend on synthetically-generated stream-like traces.

An object of the present invention is to provide a tool that can operate in a remotely-controlled test mode and in day-to-day client usage.

Briefly, a streaming media assessment system embodiment of the present invention comprises assessment servers, media clients, data collection points, helper agents, and report servers. An assessment tool is downloaded or otherwise installed on an end-user client machine and associated with its media player. An assessment server is in communication with the assessment tool over the network and can send control messages to conduct tests and gather information from the assessment tool. The client machine media player is controlled to stop and start by the assessment tool and it will provide measurements that can be forwarded to the assessment servers. Analyses are then produced by the assessment servers of the actual media streams that were received by many such client machine media players. Such can also help pinpoint where data packets are lost in the stream, and therefore provide additional information about the users' experience of the stream. The report servers issue various formatted reports for the system's sponsors and subscribers.

An advantage of the present invention is a tool is provided for an end-user perspective of streaming media session in real-time.

Another advantage of the present invention is a mechanism is provided for determining the subjective quality of a received streamed media file without requiring manual user feedback.

A further advantage of the present invention is a mechanism is provided for determining the subjective quality of a received streamed media file that uses the number of lost packets, knowledge of buffering events and other readily-obtainable stream metrics.

Another advantage of the present invention is an assessment tool for existing client media player software that measures data from actual media streams A still further advantage of the present invention is an assessment tool is provided for existing client media player software that does not depend on synthetically-generated stream-like traces.

An advantage of the present invention is a tool is provided that can operate in a remotely-controlled test mode and in day-to-day client usage.

DESCRIPTION OF THE DRAWINGS

FIG. 2 is a functional block diagram of a client machine connected to a streaming media server and an assessment server in a system embodiment of the present invention.

DETAILED DESCRIPTION OF THE EMBODIMENTS

Figure 1:
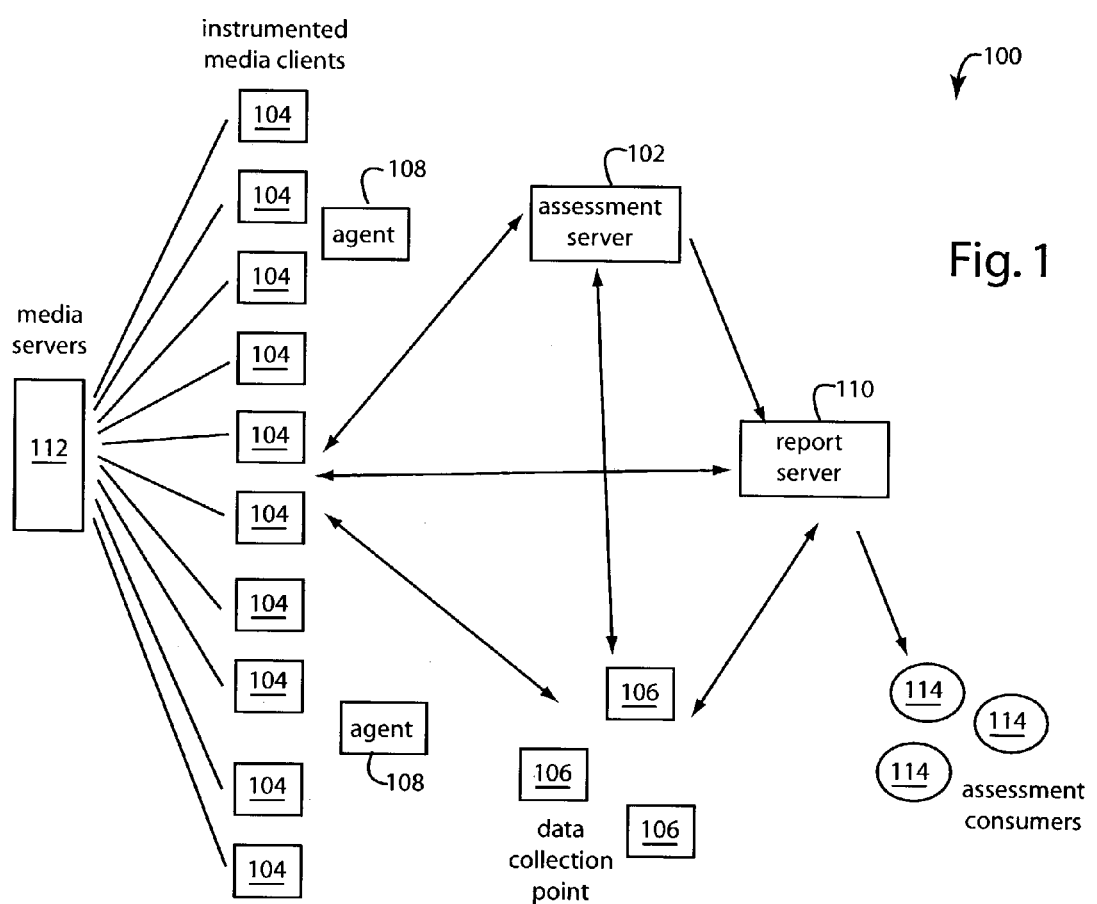
FIG. 1 is a functional block diagram of a streaming media assessment system embodiment of the resent invention.

FIG. 1 illustrates a streaming media quality assessment system embodiment of the present invention, and is referred to herein by the general reference numeral 100. The system 100 operates on and its components are interconnected by the Internet, or other computer data network. It generally comprises an assessment server 102, a number of media clients 104, a number of data collection points 106, a number of helper agents 108, and a report server 110. The media clients 104 have direct access to a media server 112 over a channel and with a type of streaming media content that is of some interest in evaluating. The media servers 112 host actual media content that is accessed by the media clients 104, and not synthetic or test content. The system 100 provides media quality assessment reports to a variety of consumers 114.

All the assessment servers 102 as a group form a distributed control center for the collection of data at the media clients, and for the distribution of information to the data collection points. The assessment servers 102 schedule and execute tests on the clients 104 and initially determine what data to return to the data collection points 106. They each can determine what data to return to the data collection points 106 on a user-by-user, or stream-by-stream basis. The assessment servers 102 detect media client non-test activity, and decide whether to collect data from particular data streams. The assessment servers 102 maintain a database of data collection points and distribute data from the media clients 104 to collection points 106. The assessment servers 102 select the analysis of collected data and which report server 110 to send the results.

The assessment servers 102 direct the analysis of the collected data, e.g., defining what analyses should be performed on what data by what collection point. They further determine which report servers to send the analyzed data sets. Such assessment servers 102 receive feedback from the report servers 110 that may include information on the usage of the analyzed data by particular sets of consumers, e.g., that data is most widely used, what appears to be lacking, etc.

The "instrumented" media clients 104 are those end users that host a streaming media assessment tool. For example, such tool can be an ad hoc program that is downloaded with the content from the media servers 112. One example of this type is a JAVA applet.

The assessment tools collect data about the media streams as they play out at media client 104. The data collected is forwarded to the data collection points 106. The assessment servers 102 determine what data to collect, when to collect it, and where to send it, all prior to runtime. In some cases, the assessment tool may be directed by helper agents 108 or the assessment server 102 to make additional measurements.

The data collection points 106 sample, reduce, and analyze data received from the clients 104. Analysis data is forwarded to an appropriate report server 110. The data collection points 106 can control data collection at particular clients 104, e.g., during a test. The data collection points 106 are preferably located topologically close to clusters of clients. For example, a collection point 106 may be placed at the "edge" of a small Internet service provider (ISP).

Report servers 110 accumulate analyzed data from the collection points 106 into consumer assessment. Examples of consumers include content providers, content producers, end users, network operators, ISP's, and capacity planners. The report servers 110 provide feedback to both the data collection points 106 and the assessment servers 102.

In the case of the data collection points 106, the report servers 110 specify if any additional data or data analysis is required, or if any data can be discarded for a particular report set. In the case of the assessment servers 102, the report servers 110 indicate if any raw data is lacking or being unnecessarily collected at the client level. The report servers 110 keep track of the assessment consumers 102 use the analyzed data and feed information back to the assessment servers 102.

Helper agents 108 preferably reside in the network at points very near the content servers 112. Such agents 108 assist in the execution and collection of additional network-level measurements, e.g., traceroute from the client to the media server or helper agent. These can also supplement the data flowing in from the users. The measurements provide supporting data for the primary analysis of client-generated data. The measurements are active and taken on demand, so this helps to more completely identify and correct faults in the system.

Referring to FIG. 2, an assessment system embodiment of the present invention is referred to herein by the general reference numeral 200. The system 200 comprises a test client machine 202 connected by a network 204 to a streaming media server 206. Such test client machine 202 includes an industry-standard media player 208, e.g., WINDOWS MEDIA PLAYER, REAL PLAYER, an MPEG-4 receiver, or other media client. The test client machine 202 is "instrumented" to enable automatic testing without requiring the involvement of the user.

Test client machine 202 further comprises a wrapper application 210, and a client-side listener 212. The media player 208 senses any degradation of received stream by the amount of player buffering it has to do, and by the number of lost packets it detects. Such metrics are passed onto wrapper application 210 and forwarded out by the client-side listener 212.

In a prototype that was tested, the wrapper application 210 was implemented as a JAVA application. The media player 208 included WINDOWS MEDIA PLAYER ACTIVEX CONTROL, version 6.4. The two communicated over the application programming interface (API) of the media player 208.

A configuration file 214 is used to store interim results and test parameters. An assessment server 216 includes a server-side controller 218 that communicates with the client-side listener 212.

The wrapper application 210, as a software application interacts with the API of the installed software media player 208. The wrapper application 210 polls the installed media player 208 at predetermined intervals for playback statistics, e.g., (1) the cumulative number of lost, recovered, and received packets; (2) the current bandwidth; and, (3) the number of times the stream has been buffered since the start of current playback. Such information can be written to configuration file 214, and/or sent back to assessment server 216.

The wrapper application 210 preferably controls operation of installed media player 208. It opens the player, sets its initialization parameters, and shuts down the player at the end of a test or file playback. The initialization parameters are included in configuration file 214 that is read every time the wrapper application 210 starts up. In alternative embodiments of the present invention, the initialization parameters can be entered directly on the same command line that the wrapper application 210 was started. In another alternative embodiment, the initialization parameters are sent over a socket.

The client-side listener 212 functions as a liaison between the server-side controller 218 and the wrapper application 210. The client-side listener 212 is preferably implemented as a standalone software application that runs in the background on each test client machine 200. It typically lies dormant until it receives a UDP-message from a controller 218. When such a message is received, the sender's authority is checked. The message that contains the command line arguments is parsed and the relevant pieces are sent to the wrapper application 210. The command line arguments cause a command to execute in the wrapper application. The listener 212 then monitors any output from the wrapper application 210 and logs the success of the command execution.

The client-side listener 212 can preferably also detect communication from the wrapper/player in a "daily usage" mode.

The server-side controller 218 resides on an assessment server 216 elsewhere on the network, and provides for remote starting of tests on the test client machines 202. User datagram protocol (UDP) is a connectionless protocol defined by industry-standards specifications RFC-768 and RFC-1122. In general, there is no guarantee that UDP-data will reach its intended destination. UDP-messages are used to pass command line arguments and data between the server-side controller 218, and the client-side listener 212 and wrapper application 210. UDP-messages can be sent to the client-side listener 212 for the wrapper 210 and media player 208 to abort a running test. Internet-type TCPmessages, and other similar protocols, can also be used effectively for communication between the client-side listener 212 and server-side controller 218.

Quality assessments are made available by embodiments of the present invention for content owners, end users, network operators, media service providers, media distribution networks, product developers, and management system providers. In a business model of the present invention, revenues can be generated by selling an analysis of the quality of the network connections to one-time purchasers or information subscribers.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for streaming media assessment, the method comprising the steps of:
   collocating a media-player wrapper application with a streaming-media player at a client machine, wherein said streaming-media player can be controlled by said media-player wrapper application, and can provide quality metrics related to streaming media programs it receives over a network connection from a streaming media server;
   remotely controlling said media-player wrapper application to gather and report said quality metrics in a reply message to an assessment server; and
   assessing the quality of said network connection between said streaming media server and said streaming-media player from data included in said reply message.

2. The method of claim 1, further comprising the step of:
   downloading said media-player wrapper application from said streaming media server for automatic installation and operation at said client machine with said streaming-media player.

3. The method of claim 1, further comprising the step of:
   forwarding an analysis of said quality of said network connection from said assessment server to a report server.

4. The method of claim 1, further comprising the step of:
   selling an analysis of said quality of said network connection from said assessment server to a one-time purchaser or information subscriber.

5. A method for streaming media assessment, the method comprising the steps of:
   collocating a plurality of media-player wrapper applications with a plurality of corresponding streaming-media players at client machines, wherein said each streaming-media player can be independently controlled by each said media-player wrapper application, and all can provide quality metrics related to streaming media programs they individually receive over network connections from streaming media servers;
   remotely controlling individual said media-player wrapper applications to gather and report corresponding said quality metrics in reply messages to an assessment server; and
   assessing the quality of respective said network connections between said streaming media servers and said streaming-media players from data reported in said reply messages.

6. A streaming media assessment tool, comprising:
   a client-side wrapper application software application for collocation within a remote client and providing for the control and reading of a remote-client software-media player;
   a server-side controller software application for collocation within an assessment server and providing for the generation of remote-client test control messages to said client-side wrapper application software application; and
   a client-side listener software application for collocation within said remote client and for responding to said remote-client test control messages, and further providing for on/off control of and the gathering of quality data from said remote-client software-media player;
   wherein, said assessment server is able to gather information on the quality of streaming media data received by said remote-client software-media player.

7. The tool of claim 6, wherein:
   the client-side listener software application provides for its program execution in the host background of said test client, and lies dormant until it receives a UDP-message from the server-side controller.

8. The tool of claim 6, wherein:
   the client-side listener software application authenticates and parses UDP-messages from the server-side controller software application, and invokes the client-side wrapper application with command line arguments, and then listens for output from the client-side wrapper application, and logs whether command execution was successful.

9. The tool of claim 6, wherein:
   the client-side wrapper application communicates through an application programming interface (API) with the client-side listener software application, and provides for polling of playback metrics at predetermined intervals.

10. The tool of claim 6, wherein:
    the client-side wrapper application has an application programming interface (API) connected to the client-side listener software application, and provides a means to abort a running test.

11. The tool of claim 6, wherein:
    the client-side listener software application and the client-side wrapper application communicate through an application programming interface (API) to open the remote-client software-media player, sets its initialization parameters, and shut it down at the end of a test or file playback.

12. The tool of claim 6, wherein:
    the client-side wrapper application accesses initialization parameters from a configuration file every time it starts up and writes them to the remote-client software-media player.

13. The tool of claim 6, wherein:
    the client-side wrapper application forwards initialization parameters from a command line to the remote-client software-media player.

14. The tool of claim 6, wherein:
    the remote-client software-media player is an unmodified commercial product; and
    the client-side wrapper application communicates through a standardized application programming interface (API) with the remote-client software-media player.

15. A streaming media assessment system, comprising:
    a plurality of media-player wrapper applications collocated with a plurality of corresponding streaming-media players at client machines, wherein said each streaming-media player can be independently controlled by each said media-player wrapper application, and all said streaming-media players can provide quality metrics related to streaming media program that said streaming-media players individually receive over network connections from streaming media servers;

a server-side controller for remotely controlling individual said media-player wrapper applications to gather and report corresponding said quality metrics in reply messages to an assessment server; and an assessment server analyzing the quality of respective said network connections between said streaming media servers and said streaming-media players from data reported in said reply messages.

\* \* \* \* \*

UNITED STATES PATENT AND TRADEMARK OFFICE
CERTIFICATE OF CORRECTION

| | | |
|---|---|---|
| PATENT NO. | : 7,216,165 B2 | Page 1 of 1 |
| APPLICATION NO. | : 10/358878 | |
| DATED | : May 8, 2007 | |
| INVENTOR(S) | : Amy Dalal et al. | |

It is certified that error appears in the above-identified patent and that said Letters Patent is hereby corrected as shown below:

On the Title page, in Item (54), in column 1, in "Title", line 1, delete "STEAMING" and insert -- STREAMING --, therefor.

In column 1, line 1, delete "STEAMING" and insert -- STREAMING --, therefor.

Signed and Sealed this

Twenty-seventh Day of January, 2009

JOHN DOLL
*Acting Director of the United States Patent and Trademark Office*